United States Patent Office 3,640,965
Patented Feb. 8, 1972

3,640,965
THERMOPLASTIC SULFUR-CONTAINING POLYMERS
George Lewis Brode, Summerville, and Timothy Lee Pickering, Kendall Park, N.J., assignors to Union Carbide Corporation, New York, N.Y.
No Drawing. Filed Oct. 2, 1968, Ser. No. 764,598
Int. Cl. C08g 22/00, 22/18
U.S. Cl. 260—77.5 AP   20 Claims

ABSTRACT OF THE DISCLOSURE

Polymers are disclosed that contain a plurality of units of the formula —SRS— which are derived from a dimercaptan of the formula HSRSH in which the R represents a divalent, aliphatic, polycyclic radical, as defined hereinafter. The polymers may be homopolymeric, i.e., —SRS—$_x$ or copolymeric —SRSY—$_x$ in which $x$ is the number of repeating units and Y is the divalent residue of a monomer which is copolymerizable with the dimercaptan.

---

This invention relates to novel thermoplastic sulfur-containing polymers and processes for the preparation of the polymers.

The novel thermoplastic sulfur-containing polymers contain a plurality of units of the formula —SRS— which are derived from a dimercaptan of the formula HSRSH in which the R represents a divalent aliphatic polycyclic radical, as defined hereinafter. The novel polymers are condensation polymers and may be either homopolymeric, i.e., polydisulfides having essentially the average general formula —SRS—$_x$ in which R is as defined hereinafter and $x$ represents the number of units in the average molecule of the polymer; or the polymers may be copolymeric, i.e., copolymers having the average general formula —SRSY—$_x$ in which R and $x$ have the same meanings as given above and Y is the divalent residue of a monomer which is copolymerizable with the dimercaptan. For example, Y can be the residue from phosgene in which case the product would be a homopolythiocarbonate of the formula

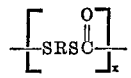

the residue from a dichloroformate, e.g., bisphenol A dichloroformate, in which case the product would be a polythiocarbonate of the formula

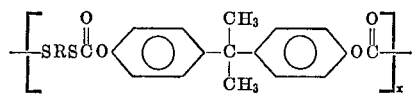

the residue from a diacid chloride, e.g., terephthaloyl chloride, in which case the product would be a polythioester of the formula

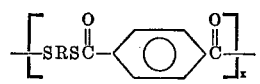

the residue from epichlorohydrin, for example, in which case the product would be a polythioether of the formula

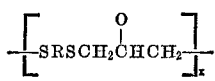

the residue from an organic dihalide, e.g., methylene chloride, in which case the product would be a polythioformal of the formula

or the residue from a diisocyanate, e.g., diphenylmethane-4,4'-diisocyanate, in which case the product would be a polythiourethane of the formula

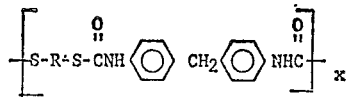

As mentioned above, the novel polymers are derived from a dimercaptan HSRSH, in which R is a divalent polycyclic radical containing from 2 to about 8 saturated aliphatic rings therein, each ring being defined as the smallest number of covalently bonded carbon atoms which form a definable ring, which rings each contain 4 to 6 ring carbon atoms, and the 2 mercapto radicals are each bonded to a different carbon atom, each mercauto-bonded carbon atom being in a different ring. Illustrative of the dimercaptan monomers which can be polymerized to form the novel polymers of our invention are the following:

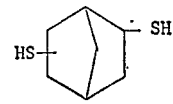

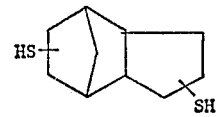

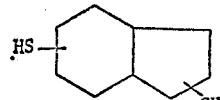

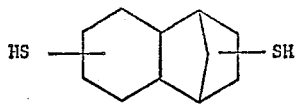

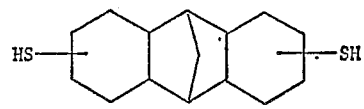

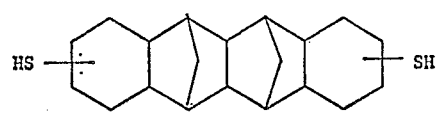

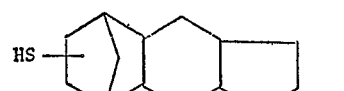

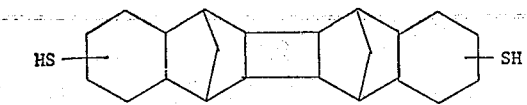

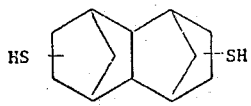

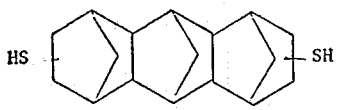

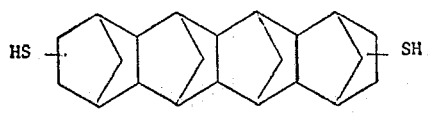

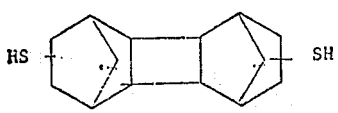

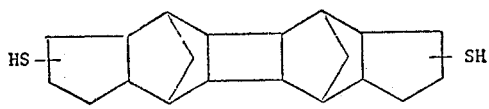

The preferred monomers are 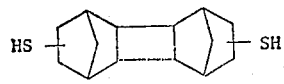 and

The starting materials may be prepared by the addition of 2 moles of $H_2S$ to the corresponding diolefins or by the addition of a thiolcarboxylic acid to the corresponding diolefins and subsequently hydrolyzing the bisthiocarboxylate to the dimercapto derivative. This latter two-step process and certain of the dimercaptans are the subject of copending application Ser. No. 764,597 filed Oct. 2, 1968 of G. L. Brode and T. V. Van Auken being filed concurrently entitled Process for the Preparation of Cyclo-Aliphatic [1]. The starting diolefins containing only 5 and/or 6 membered rings for either of the processes may be prepared by Diels-Alder synthesis using cyclopentadiene, acetylene, butadiene, etc., and the simpler addition products resulting therefrom as is indicated in that copending application. The starting materials for those dimercaptans which also contain 4-membered rings may be prepared by dimerization of the appropriate chlorinated olefins—e.g., in accordance with the processes disclosed in copending applications Ser. Nos. 365,527 of D. R. Arnold, D. J. Trecker and C. E. Stehr, filed May 6, 1964, now Pat. No. 3,483,102 and 573,833 of E. A. Rick and R. L. Pruett, filed Aug. 22, 1966, now Pat. No. 3,458,-550. The dimerization is effected through the formation of a cyclobutane ring. The resulting chlorinated compounds containing 4-membered rings may be converted to the dimercaptans in accordance with the process indicated in application Ser. No. 365,527; i.e., by reaction of $H_2S$ with the chlorinated intermediates. The bis(thiocarboxylates) from pentacyclo[$8.2.1.1^{4.7}.0^{2.9}.0^{3.8}$] tetradecadiene are disclosed and claimed in application Ser. No. 676,030 of E. A. Rick and R. L. Pruett, filed Oct. 18, 1967. These compounds may be hydrolyzed to the corresponding dimercapto derivatives.

The novel polymers of this invention include those which may be illustrated by the following formula:

$$\left[ S-R-S-(Y)_z \right]_x$$

in which R and x are as defined herein and z is either zero or one. It may be seen that when z is zero, the polymer is homopolymeric and that when z is one, the polymer is copolymeric. Of course, Y and/or R can vary throughout the polymer, and then the polymer would be terpolymeric, etc.

The novel homopolymers of this invention have the average general formula $$\left[ SRS \right]_x$$

in which R is as defined above, and x has a value such that the polymer is normally a solid. The symbol x has a number average molecular weight generally greater than 20,000, generally below 100,000, preferably in the range of about 30,000 to about 70,000.

Illustrative of the novel homopolymers of our invention are those having the following average general formulas:

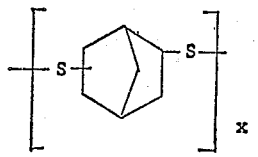

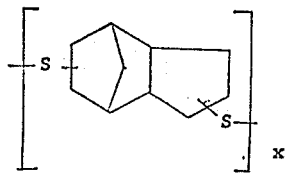

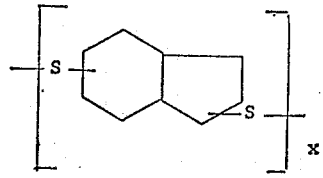

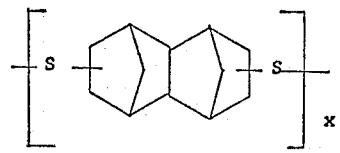

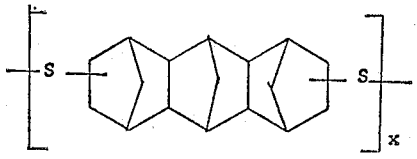

---
[1] Thiocarboxylates and cycloaliphatic mercaptans.

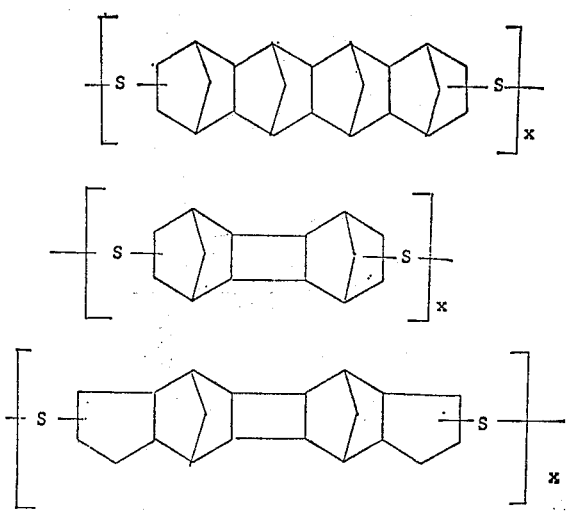

The novel homopolymers may be made by self-condensing the dimercaptan reactant in the presence of oxygen from air or any other convenient source of molecular oxygen. Generally the dimercaptan is dissolved in an inert, aprotic solvent, such as dimethyl sulfoxide or pyridine; a cuprous amine complex catalyst, such as cuprous chloride is added; and the oxygen is supplied to the solution, e.g., by bubbling air through it. The reaction is generally conducted at a temperature of from about 25° C. to about 100° C. Low temperatures are preferred because the solubility of oxygen in the solution is greater at lower temperatures.

The copolymers available from the bis mercaptans used in this invention are condensation polymers characterized as having the repeating unit represented by the structure:

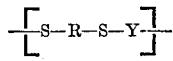

The divalent radical Y of the above structure is a divalent hydrocarbon radical Q, a

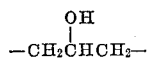

or a

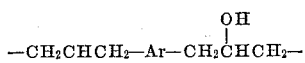

radical, or a

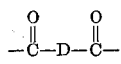

radical, in which D is at least one of the groups represented by the formula (a)                         —Q—
(b)                         —O—Q—O—
(c)                         $\begin{array}{cc} R_1 & R_2 \\ | & | \\ -N-P-N- \end{array}$
(d)                         —S—R—S— in which Q represents a divalent hydrocarbon group, and wherein each of $R^1$ and $R^2$ represents hydrogen or a monovalent lower hydrocarbon group, or together represents a divalent alkylene bridge between the nitrogen atoms when Q is also an alkylene bridge, such as would result from piperazine, and R has the meaning given above.

Thus, as is readily seen, the polymers of our invention can be polythioethers when Y is a divalent hydrocarbon radical, a polyhydroxy polythioether when Y is a

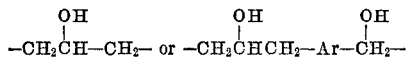

radical; and when Y is a

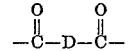

radical the polymers can be polythioesters when D is represented by the structure (a) above or a polythiocarbonate when D is represented by the structure (b) or (d) above, or a polythiourethane when D is the structure represented by (c) above. It is, of course, contemplated that interpolymers are also possible in which different D groups are present in the same polymeric chains, as for example, in a poly(thiocarbonate-thiourethane).

In this invention, Q can be any divalent hydrocarbon group, even those having a few as one or as many as 25 or more carbon atoms as for example, any of the alkylene radicals and preferably ethylene, tetramethylene, pentamethylene and hexamethylene radicals, as well as cycloalkylene and arylene radicals such as 1,3-cyclobutylene, 1,3-cyclopentylene, 1,4-cyclohexylene, 2-cyclohexene-1,4-ylene, 2,5-cyclohexadiene-1,4-ylene, 1,4-phenylene, 1,8-naphthylene, 2,4-tolylene, 2,5-tolylene and similar groups as well as mixed phenylene bonded groups such as may result from the residues of polynuclear phenols such as those having the general formula

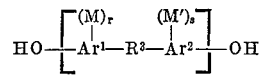

in which event the hydrocarbon Q group represents that residue between the brackets in which $Ar^1$ and $Ar^2$ are an aromatic divalent hydrocarbon such as phenylene, M and M' which can be the same or different are alkyl radicals, preferably having from 1 to 4 carbon atoms, halogen atoms, i.e., fluorine chlorine, bromine and iodine, or alkoxy radicals, preferably having from 1 to 4 carbon atoms, $r$ and $s$ are integers having a value from 0 to a maximum value corresponding to the number of hydrogen atoms on the aromatic radical ($Ar^1$ or $Ar^2$) which can be replaced by substituents and $R^3$ is a bond between adjacent carbon atoms as in dihydroxydiphenyl or is a divalent radical including for example

—O—, —S—, —SO—, $SO_2$— and —S—S—, and divalent hydrocarbon radicals such as alkylene, alkylidene, cycloaliphatic, e.g., cycloalkylene, and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an $Ar^1$ or $Ar^2$ group or $R^3$ can be polyalkoxy, or polysiloxy, or two or more alkylidene radicals separated by an aromatic ring, a tertiary amino group, an ether linkage, a carboxyl group or a sulfur containing group such as sulfoxide and the like.

Examples of specific dihydric polynuclear phenols include among others:

The bis(hydroxyphenyl)alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(p-hydroxyphenyl)-ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane, 2,2-bis(3-isopropyl-4-hydroxyphenyl)propane
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl)1,2-bis(phenyl)propane,
2,2-bis-4-hydroxyphenyl-1-phenyl-propane and the like; di(hydroxyphenyl)sulfones such as bis(4-hydroxyphenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like; di(hydroxyphenyl)ethers such as bis(4-hydroxyphenyl)ether,
the 4,3'-, 4,2'-, 2,2'-, 2,3'-, dihydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether and the like.

Also suitable are the bisphenol reaction products of 4-vinyl-cyclohexene and phenols, e.g., 1,3-bis(p-hydroxyphenyl)-1-ethylcyclohexane, and the bisphenol reaction products of -pinene or its isomers and phenols as well as bisphenols such as 1,3,3 - trimethyl - 1 - (4 - hydroxyphenyl) - 6 - hydroxyindane, and 2,4 - bis(4 - hydroxyphenyl)-4-methylpentane, and the like.

Particularly desirable polymers result from those wherein Q has the formula

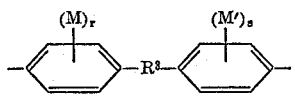

wherein M and M' are as previously defined, $r$ and $s$ have values from 0 to 4 inclusive, and $R^3$ is a divalent saturated aliphatic hydrocarbon radical, particularly alkylene and alkylidene radicals having from 1 to 3 carbon atoms, and cycloalkylene radicals having up to and including 9 carbon atoms.

It is understood that wherever cis- and trans-geometrical isomers exist in the chemical structures discussed in this invention that both are included unless specified to the contrary.

The novel homopolythiocarbonates of this invention have the average general formula

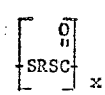

in which R and $x$ are as defined above.

Illustrative of the novel homopolythiocarbonates of our invention are those having the following average general formulas:

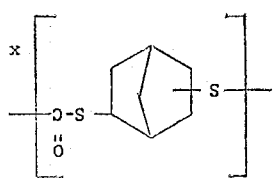

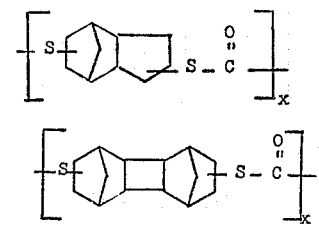

The preferred homopolythiocarbonates are and

The novel homopolythiocarbonates may be made by reacting the dimercaptan reactant with phosgene under essentially anhydrous conditions in the presence of an acid acceptor, preferably a tertiary amine, most preferably pyridine. A solvent for the polymer product is also present in the reaction mixture. Suitable solvents are, e.g., methylene chloride, chloroform or the like. An inert atmosphere is employed, e.g., argon, nitrogen, methane or the like. Pressure is not a critical factor. Atmospheric, subatmospheric or superatmospheric pressures may be used. Temperatures in the range of from about 0° C. to about 40° C. may be employed. The polymer in the reaction solution may be coagulated by admixing the solution with a solvent in which the polymer is insoluble. Suitable solvents include the alcohols, e.g., ethanol, isopropanol, the butanols and the like.

The novel polythiocarbonates of our invention have the average general formula

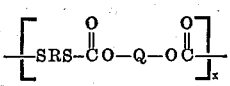

in which R and x are as defined above and Q is a divalent organic radical, as previously defined. Preferred are alkylene radicals containing up to 10 carbon atoms, e.g., methylene, ethylene, propylene, butylene, pentylene, hexylene, decylene, and their various isomers. Also preferred are the divalent aromatic radicals containing up to about 15 carbon atoms. Most preferred is that derived from bisphenol A, i.e.,

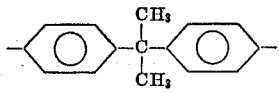

Illustrative of the novel polythiocarbonates of our invention are those having the following average general formulas:

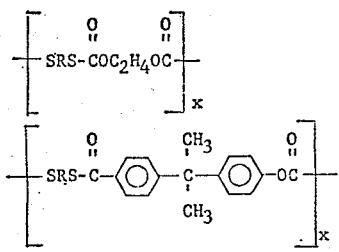

in which R is the cycloaliphatic moiety from the dimercaptan HSRSH, illustrative and preferred species of which are indicated above.

The novel polythiocarbonates may be made by condensing the dimercaptan reactant with bis chloroformates of the formula

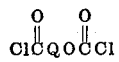

in which Q has the meaning given above, in a solvent for the product polymer, e.g., a chlorinated hydrocarbon and in the presence of an acid acceptor, e.g., pyridine or triethylamine or any other tertiary amine.

The novel polyhydroxy polythioethers of our invention have the average general formula

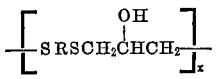

in which R and x are as defined above.

Illustrative of the novel polyhydroxy polythioethers of our invention are those having the following average general formulas:

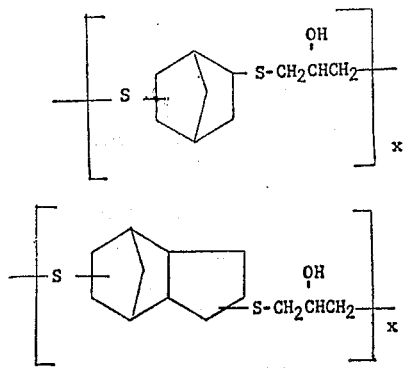

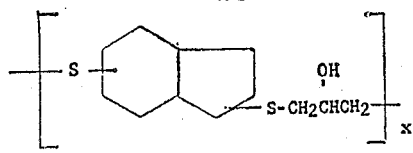

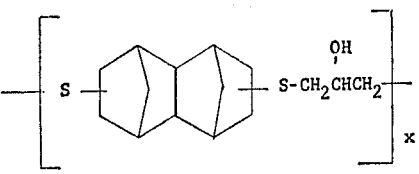

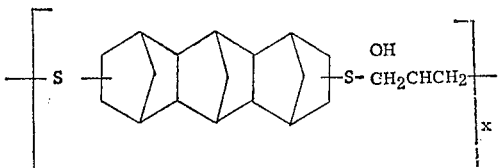

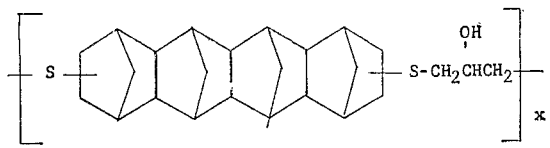

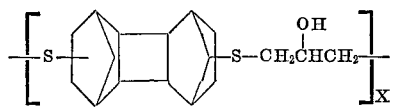

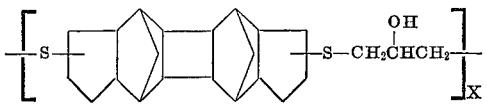

The preferred polyhydroxy polythioethers are

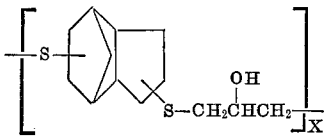

and

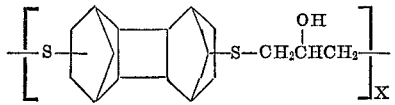

The novel polyhydroxy polythioethers may be made by reacting the dimercaptan reactant with an epihalohydrin, e.g., epichlorohydrin or epibromohydrin or a dihalohydrin, e.g. dichloro- or dibromohydrin and a base, both being present in essentially equimolar quantities in a solvent for the product polymer. Epichlorohydrin is the preferred reactant. Illustrative of the bases which may be used are NaOH and KOH and the like. Illustrative of the solvents which may be used are cyclohexanone, N-methylpyrrolidone, dimethylformamide, dimethylsulfoxide, hexamethylphosphoramide, toluene/n-butanol, and the like.

The reaction is exothermic and, therefore, the epichlorohydrin should be added slowly so as to maintain a reaction temperature of from about 25° C. to about 150° C. Cooling may be used if required. The reaction is conducted in an inert atmosphere. Argon, nitrogen, methane etc. may be used. Although the reaction pressure may be varied, there is generally no benefit derived from so doing. Atmospheric pressure is preferred.

The polyhydroxy polythioethers can be made in any desired reduced viscosity. However, it is preferred that the reduced viscosity (0.2% in $CHCl_3$) be greater than about 0.4, more preferably in the range of from about 0.5 to about 1.0. Polymers with a reduced viscosity greater than about 0.4 have been found to be tougher than those of lower reduced viscosities.

Novel polyhydroxy polythioethers may also be prepared from the condensation of the dimercaptans of this invention, i.e. HSRSH, with the diglycidyl ethers of aromatic bisphenols of the formula

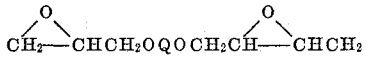

in which Q represents the appropriate groups represented above, e.g., the glycidyl ether of bisphenol A, or with the diglycidyl thioether of an aliphatic dimercaptan such as those in the copending Application Serial No. 764,638, filed Oct. 2, 1968 of G. L. Brode and T. L. Pickering being filed concurrently, and entitled Glycidyl Thioethers i.e., of the formula

The respective average general formulas for the products would

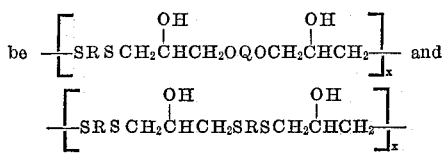 and

R, of course, has the meaning given above.

The condensations are conducted in a solvent for the product polymer, preferably a chlorinated aromatic solvent, e.g., chlorobenzene and in the presence of a catalytic amount of base, e.g., a tertiary amine, such as triethylamine, or an alkali metal alkoxide or hydroxide. The temperature of the reaction can range from about 50° C. to about 200° C.

The novel polythioethers of this invention have the average general formula

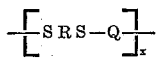

in which Q repersents a divalent hydrocarbon group as described above.

Preferred novel polythioethers are those having the foregoing average general formulas in which Q represents an alkylene of up to about 10 carbon atoms or a divalent aromatic-containing hydrocarbon radical containing from 6 to about 15 carbon atoms.

The novel polythioethers may be prepared by dissolving one mole of the dimercaptan in a solvent for the product polymer, e.g., dimethyl sulfoxide or a chlorinated aromatic solvent, e.g., chlorobenzene, then dehydrating an alkali metal hydroxide, e.g., KOH before adding 2 moles of it to the solution with one mole of a dichloride of the formula ClQCl. Incidentally, if Q is aromatic then it should be activated by an electron withdrawing group in m- or p-position, e.g., dichlorodiphenylsulfone. The reaction is conducted at a temperature of from about 120° C. to about 170° C., e.g., about 160° C.

The novel polythioesters of our invention have the average general formula

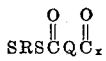

in which R, Q and x have the meanings given above.

Preferred novel polythioesters of our invention are those of the foregoing average general formula in which Q is an alkylene containing up to about 10 carbon atoms or a divalent aromatic-containing hydrocarbon radical containing up to about 15 carbon atoms.

The novel polythioesters of our invention may be prepared by reacting the dimercaptan HSRSH with a diacid chloride of the formula

in solution in a solvent for the product polymer. The solvent may be an aromatic solvent or a chlorinated hydrocarbon, e.g., chlorobenzene, trichlorobenzene etc. The reaction may be conducted at a temperature of from about 100° C. to about 250° C. at which the HCl is boiled off, or the reaction may be conducted at a temperature of from about 0° C. to about 100° C. in the presence of an acid-acceptor, e.g., a tertiary amine, e.g., pyridine or triethylamine.

The novel polythiourethanes of our invention have the average general formula

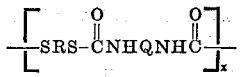

in which R, Q and x are as hereinbefore defined.

The polythiourethanes may be prepared by the reaction of a diisocyanate with the dimercaptan HSRSH in the presence of a catalytic amount of a tertiary amine and at a temperature of from about 75° to about 150° C.

The isocyanates which are within the purview of the present invention are organic isocyanates containing two isocyanate groups. These organic diisocyanates can be alkyl, cycloalkyl, aryl, aralkyl, alkaryl or aralkaryl diisocyanates. Preferred aryl diisocyanates are those whose groups are attached to different ring carbon atoms of the same or different aromatic nuclei. It is further preferred to employ as the aryl polyisocyanate of this invention, an aryl diisocyanate although triisocyanates or higher polyisocyanates can also be used, if preferred. For economic reasons, it is especially preferred to employ as the aryl diisocyanates, 2,4-diisocyanatotoluene or 2,4-tolylene diisocyanate (TDI) or dianisidine diisocynate (3-methoxy-4-isocyanatobisphenyl).

As examples of other suitable polyisocyanates which can be employed herein can be mentioned, 1,2-diisocyanatoethane,
1,3-diisocyanatopropane,
1,2-diisocyanatopropane,
1,4-diisocyanatobutane,
1,5-diisocyanatopentane,
1,6-diisocyanatohexane,
bis(3-isocyanatopropyl)ether,
bis(3-isocyanatopropyl)sulfide,
1,7-diisocyanatoheptane,
1,5-diisocyanato-2,2-dimethylpentane,
1,6-diisocyanto-3-methoxyhexane,
1,8-diisocyanatooctane,
1,5-diisocyanato-2,2,4-trimethylpentane,
1,9-diisocyanatononane,
1,10-diisosyanatodecane,
1,6-diisocyanato-3-butoxyhexane,
the bis(3-isocyanatopropyl)ethers of 1,4-butylene glycol,
1,11-diisocyanatoundecane,
1,12-diisocyanatododecane,
bis(isocyantohexyl)sulfide,
1,4-diisocyanatobenzene,
2,4-diisocyanatotoluene,
1,3-diisocyanato-o-xylene,
1,3-diisocyanato-m-xylene,
1,3-diisocyanto-p-xylene,
2,4-diisocyanato-1-chlorobenzene,
2,4-diisocyanato-1-nitrobenzene,
2,5-diisocyanato-1-nitrobenzene,
3,6-diisocyanato-1,4-dichlorobenzene,
2,5-diisocyanato-1-chloro-4-methoxybenzene,
2,5-diisocyanato-1-methoxybenzene,
2,4-diisocyanato-1-methoxybenzene,
2,5-diisocyanato-1-methyl-4-methoxy-benzene,
2,4-diisocyanato-1-ethylbenzene,
2,4-diisocyanato-1-ethoxybenzene,
4,6-diisocyanato-1,3-dimethoxybenzene,
2,5-diisocyanato-1,4-dimethoxybenzene,
2,4-diisocyanato-1-propylbenzene,
2,5-diisocyanato-1-propylbenzene, 2,4-diisocyanato-1-isobutylbenzene,
2,4-diisocyanato-1-isobutoxybenzene,
2,5-diisocyanato-1,4-diethoxybenzene,
1,3-diisocyanatocyclohexane,
1,4-diisocyanatocyclohexane,
1,4-diisocyanatonaphthalene,
1,5-diisocyanatonaphthalene,
2,6-diisocyanatonaphthalene,
2,7-diisocyanatonaphthalene,
1-(isocyanatomethyl)-2-(3-isocyantopropyl)-3,5-dimethylcyclohexane,
1,3-bis(4-isocyanatophenyl)propane,
α,β-bis(2-isocyanatoethyl)-9,10-endoethylene dihydroanthracene,
2,4-diisocyanato-1-methylcyclohexane,
2,4-diisocyanato-1-ethylcyclohexane,
bis(4-isocyanatocyclohexyl)methane,
1,1-bis(4-isocyanatocyclohexyl)ethane,
2,2-bis(4-isocyanatocyclohexyl)-propane,
bis(2-methyl-4-isocyanathoxyl)methane,
bis(3,5-dimethyl-4-dimethyl-4-isocyanatohexyl)methane,
1-isocyanatomethyl-4-isocyanatobenzene,
1-(2-isocyanatoethyl)-4-isocyanatobenzene,
1-(2-isocyanatoethyl)-3-isocyanatobenzene,
1-(3-isocyanatopropyl)-4-isocyanatobenzene,
1-(4-isocyanatobutyl)-4-isocyanatobenzene,
1,5-diisocyanatotetrahydronaphthalene,
4,4'-diisocyanatoazobenzene,
2-methyl-4,4'-diisocyanatoazobenzene,
4,4'-diisocyanato-1-naphthaleneazeobenzene,
2,4-diisocyanatodiphenyl ether,
dianisidene diisocyanate,
ethylene glycol bis(4-isocyanatophenyl)ether,
diethylene glycol bis(4-isocyanatophenyl)ether,
2,2'-diisocyanatobiphenyl,
2,4-diisocyanatobiphenyl,
4,4-diisocyanatobiphenyl,
3,3'-dimethoxy-4,4'-diisocyanatobiphenyl,
3,3'-dimethyl-4,4'-diisocyanatobiphenyl,
3,3'-dimethyl-4,4'-diisocyanatobiphenyl,
2-nitro-4,4'-diisocyanatobiphenyl,
bis(4-isocyanatophenyl)methane,
bis(2-methyl-4-isocyanatophenyl)methane,
2,2-bis(4-isocyanatophenyl)-propane,
bis(2,5-dimethyl-4-isocyanatophenyl)methane,
cyclohexyl-bis(4-isocyanatophenyl)methane,
bis(3-methoxy-4-isocyanatophenyl)-methane,
bis(4-methoxy-3-isocyanatophenyl)methane,
bis(2-methyl-5-methoxy-4-isocyanatophenyl)methane,
2,2-bis(3-chloro-4-isocyanatophenyl)propane,
2,2'-diisocyanatobenzophenone,
2,4-diisocyanatodibenzyl,
p-nitrophenyl-bis(4-isocyanatophenyl)methane,
phenyl-bis(2,5-dimethyl-4-isocyanatophenyl)methane,
2,7-diisocyanatofluorene,
2,6-diisocyanatophenanthroquinone,
3,6-diisocyanato-9-ethylcarbazole,
3,8-diisocyanatopyrene,
2,8-diisocyanatochrysene,
2,4-diisocyanatodiphenylsulfide,
bis(4-isocyanatophenyl)sulfide,
bis(4-isocyanatophenyl)sulfone,
bis(4-isocyanatobenzyl)sulfone,
2,4'-diisocyanato-4-methyldiphenylsulfone,
4-methyl-3-isocyanatobenzylsulfonyl-4'-isocyanatophenyl ester,
4-methoxy-3-isocyanatobenzylsulfonyl-4'-isocyanatophenyl ester,
bis(2-methyl-4-isocyanatophenyl)disulfide,
bis(3-methyl-4-isocyanatophenyl)disulfide,
bis(4-methyl-3-isocyanatophenyl)disulfide,
bis(4-methoxy-3-isocyanatophenyl)disulfide,
bis(3-methoxy-4-isocyanatophenyl)-disulfide,
4-methyl-3-isocyanatobenzylsulfonyl-4-isocyanato-3-methylanilide,
N,N'-bis(4-isocyanatobenzylsulfonyl)1,2-diaminoethane,
bis(3-methoxy-4-isocyanatobenzyl)sulfone,
1,2-bis(4-methoxy-3-isocyanatobenzylsulfonyl)ethane,
N,N'-bis(4-methoxy-3-isocyanatobenzyl)-12, diaminoethane, and the like.

The polurethanes of this invention may also be produced by the reaction of the dimercaptan HSRSH with piperazine dicarbamoyl chloride (i.e., the product of 1 mole of piperazine and 2 moles of phosgene) and a stoichiometric amount of an acid-acceptor, i.e., a base such as a tertiary amine or $K_2CO_3$, preferably in a solvent for the product polymer, e.g., dichloroethane, chlorobenzene or chloroform, and at a temperature of from about 25° C. to about 100° C.

The piperazines preferred in the synthesis of the condensation polymers of this invention include piperazine itself a well as alkyl substituted piperazines such as 2,5-dimethylpiperazine, 2,5 - diethylpiperazine, 2,3,5 - trismethylpiperazine 2,3,5,6-tetramethylpiperazine and the like. Both cis and trans forms of these alkyl substituted piperazines can be used.

The polythiourethane syntheses can be carried out in the melt or in a solvent system by techniques well known in the art. Where solvents are empolyed, aliphatic ketones such as methyl isobutyl ketone, diisobutyl ketone and the like and high polar solvents such as dimethyl sulfoxide, dimethyl formamide and the like as well as mixtures of these solvent are ueful. Subatmospheric pressures are preferred for the obtention of high molecular polythiourethanes although atmospheric and superatmospheric pressures can also be used, if molecular weight and polymerization efficiency are not important.

It is preferred that the reactants be present in stoichiometric quantities although variations in the form of greater or less than any of the reactants can be used if the molecular weight of polythiourethane is not important.

Polymerization catalysts are not essential and can be omitted if desired. When catalysts are used, alkali metal hydroxides such as lithium hydroxide and potassium hydroxide and the like are preferred. Other catalysts which can be used include sodium hydroxide and cesium hydroxide, as well as alkali metals themselves Na, K or Li and the like.

No workup of polythiourethanes made in the melt is necessary. Those made in solution are recovered by precipitation with methanol, or other miscible, precipitating solvents.

Generally, the polythiourethanes of this invention are particularly useful as lacquers and for the formation of scuff and heat resistant coatings. The lower melting polythiourethanes also serve as pressure senitive adheives for bonding metallic, cellulosic, siliceous, and polymeric substrates.

The copolymers of this invention are made from essentially stoichiometric amounts of the monomers employed. Variance from stoichiometric amounts should not exceed a few percent. Preferably, the amounts employed should be within about ± 1% of the stoichiometric amounts. While deviations from the stoichiometric ratio can be employed, they usually result in a polymer of lower molecular weight.

Throughout the application isomers have been indicated pictorially by a line between two ring carbons. Pure isomers may be used, but are difficult to obtain and offer no advantage. In fact, since the processes for the preparation of the dimercaptans results in a mixture of the indicated isomers and the mixture is a liquid, which is therefore easy to use, the mixture of isomers is preferred.

The polymers of this invention are useful as films, molded objects, and coatings, etc. The polyhydroxy polythioethers have a unique combination of moisture $CO_2$ and oxygen barrier properties which make them potential packaging materials.

The following examples are illustrative of our invention.

EXAMPLE 1

Preparation of a polythiocarbonate

To a clean, argon-flushed, 100 ml. round bottom flask were added 5.535 gm. (0.027 mole) tricyclodecane dithiol, 9.951 gm. (0.027 mole) bisphenol A dichloroformate and 50 ml. of dry 1,2-dichloroethane. The solution was stirred with a magnetic stirrer and heated to 50° C., at which point 10 ml. of dry pyridine were added. Stirring was continued for two hours at reflux. The mixture was cooled, filtered to remove the pyridine-hydrochloride and coagulated in isopropanol. The polymer fluff thereby obtained was recovered and dried in vacuo at 60° C. The polymer had a reduced viscosity (0.2% in $CHCl_3$ at 25° C.) of 0.78. Clear films could be obtained by solution-casting or compression-molding techniques. Typical film properties were: Glass transition temperature, 165° C.; tensile modulus, 250,000 lbs./in.$^2$; tensile strength, 9,500 lbs./in.$^2$.

EXAMPLE 2

Preparation of a polythioester

To a clean, dry 100 ml. resin kettle were added 10.33 gm. 0.051 mole) tricyclodecane dithiol, 10.52 gm. (0.052 mole) terephthaloyl chloride and 50 ml. trichlorobenzene. The mixture was brought to reflux and held there for four hours. When cooled, the polymer was coagulated in isopropanol and dried in vacuo at 100° C. The polymer had a reduced viscosity (0.2% in $CHCl_3$ at 25° C.) of 0.53. It could be cast or molded into tough films. Typical properties were: Glass transition temperature, 250° C.; tensile modulus, 230,000 lbs./in.$^2$; tensile strength, 8,500 lbs./in.$^2$; pendulum impact, 80 ft. lbs./in.$^3$.

EXAMPLE 3

Preparation of a polythioester

Example 2 was repeated, but pentacyclotetradecane dithiol was used instead of tricyclodecane dithiol. Properties of the polymer produced were: Glass transition temperature 310° C.; tensile strength, 7,200 p.s.i.; pendulum impact, 95 lbs./in.$_3$; tensile modulus 240,000 p.s.i.

EXAMPLE 4

Preparation of a polyhydroxythioether

A three neck, 100 ml. Morton flask equipped with stirrer, thermometer, argon inlet, condenser, Dean-Stark trap and addition funnel was flushed with argon for 20 min. To this flask were added 10.93 gm. (0.043 mole) of pentacyclotetradecane dithiol, 0.043 mole of 50% aqueous potassium hydroxide. 15 ml. hexamethylphosphoramide and 15 ml. t-butanol. The flask was heated by means of an oil bath and the t-butanol/water azeotrope was distilled off until the flask reached a temperature of 115° C. A hard white solid was obtained. The flask was cooled to 30° C., and 3.98 gm. (0.043 mole) of epichlorohydrin were slowly added. After 30 minutes the mixture had become semi-solid. The flask was heated to 100° C., and the reaction was continued for 3 hours. The mixture was cooled and 60 ml. of $CHCl_3$ were added to dissolve the mass. The $CHCl_3$ solution was filtered, washed three times with water and coagulated in isopropanol. The coagulated polymer was again taken up in $CHCl_3$ and coagulated in isopropanol, then dried in vacuo 16 hours at 100° C. The resulting white fluff had a reduced viscosity (0.2% in $CHCl_3$ at 25° C.) of 0.52. The polymer could be formed into clear, moderately tough films by solution-casting or compresison-molding techniques. The resulting films show excellent oxygen and moisture vapor barrier properties and have glass transition temperatures of 130° C.

EXAMPLE 5

Preparation of a polyhydroxythioether

A three neck, 50 ml. Morton flask equipped with stirrer, condenser, a argon inlet and addition funnel was flushed with argon for 20–30 minutes. To this flask were added 5.28 gm. (0.026 mole) of tricyclodecane dithiol, 5 ml. of cyclohexanone and 0.03 mole of KOH as a 50% aqueous solution. A cooling bath was applied and 2.46 gm. (0.026 mole) of epichlorohydrin were slowly added. A viscous white mass formed immediately. The mixture was stirred 16 hours at 25° C. and then heated to reflux and held for four hours at 25° C. and then heated nated by adding 0.004 mole of phenol dissolved in 2 ml. of cyclohexanone. After cooling to room temperature the polymer layer was washed three times with water and coagulated in isopropanol. The polymer fluff was recovered, dissolved in $CHCl_3$, filtered and recoagulated. The material was vacuum dried at 100° C. to give 4.75 gm. of white resin. The material had a reduced viscosity (0.2% in $CHCl_3$ at 25° C.) of 0.42. The material could be fabricated into clear films by molding or solution casting. Typical film properties were: glass transition temperature, 60° C.; tensile modulus, 400,000 p.s.i.; tensile stregnth, 7000 p.s.i. The material has excellent oxygen nad moisture vapor barrier properties.

EXAMPLE 6

Preparation of a polythioformal

A 3 neck, 100 ml. Morton flask equipped with stirrer, addition funnel, condenser, argon inlet and thermometer was flushed with argon for 20–30 minutes. To this flask were added 11.00 gms. (0.054 mole) tricyclodecane dithiol, 15 ml. dimethylsulfoxide and 0.108 moles of KOH as a 50% aq. solution. A cooling bath was applied, and then 4.76 gm. (0.054 mole) of methylene chloride were added slowly. After the addition was complete, the mixture was heated to 100° C. and held there for four hours. When cooled, the mixture was coagulated in isopropanol. A tan powder was recovered, dissolved in $CHCl_3$, washed three times with water, filtered, recoagulated and vacuum-dried to give 7.1 gm. of cream colored resin, which had a reduced viscosity (0.2% in $CHCl_3$ at 25° C.) of 0.23. The resin could be molded or cast into clear yellow films. The films had softening points of 70–80° C.

EXAMPLE 7

Preparation of a polydisulfide

To a one neck, 50 ml. round bottom flask were added 2.2 gm. of tricyclodecane dithiol, 1.1 gm. $(CuCl)_2$ and 75 ml. of pyridine. Air was bubbled through the solution for 2½ days. The mixture was coagulated in isopropanol; and the precipitate was recovered, washed once with $NH_4OH$ solution, twice with water and vacuum dried 16 hours. The brown powder so obtained had a reduced viscosity (0.2% in pyridine at 25° C.) of 0.05. The polymer could be compression-molded into clear yellow films which had softening points of 120–130° C.

EXAMPLE 8

Preparation of a polythioether

To a 50 ml. resin kettle equipped with stirrer and oil bath were added 9.93 gm. (0.049 mole) tricyclodecane dithiol and 10.46 gm. (0.049 mole) 2,6-di chloro-9-thiabicyclo[3.3.1]nonane. The mixture was heated 3 hours at 90° C. and 1 hour at 170° C., whereupon the mixture solidified. When cooled, the mass was dissolved in $CHCl_3$ and coagulated in isopropanol. The recovered white powder was vacuum dried 16 hours at 100° C. to give a material with a reduced viscosity (0.2% $CHCl_3$ at 25° C.) of 0.10.

EXAMPLE 9

Preparation of a polythiourethane

A three neck 100 ml. resin kettle equipped with stirrer, addition funnel and argon inlet is flushed with argon for 20-30 min. To the kettle are added 25.0 gm. (0.10 mole) methylene bis-(4-phenyl isocyanate) and 25 ml. methyl ethyl ketone. To the resulting suspension are added 25.2 gm. (0.10 mole) pentacyclotetradecane dithiol in 25 ml. of dimethylsulfoxide. The mixture is stirred at 110°–120° C. for two hours, then cooled to room temperature. The viscous mass is coagulated in isopropanol, and the fluff recovered and dried in vacuo for 16 hours at 100° C. The polymer can be formed into clear, tough films by compression molding or casting techniques.

EXAMPLE 10

Preparation of a homopolythiocarbonate

To a clean, dry, 250 ml. three neck flask are added 10.15 gm. (0.05 mole) tricyclodecane dithiol, 60 ml. dry pyridine and 100 ml. dry methylene chloride. The flask is equipped with a stirrer, condenser, argon inlet, phosgene inlet and drying tube. Phosgene is bubbled in below the surface of the solution at a fairly rapid rate. When 75% of the theoretical amount of phosgene has been added, the rate of addition is greatly reduced; and the addition continued at this reduced rate for 8–15 hours. At the end of this time the solution is filtered and then coagulated in isopropanol. The polymer fluff is recovered and dried in vacuo at 100° C. The polymer can be cast into films which have high glass transition temperatures.

What is claimed is:

1. A polymer containing a plurality of repeating units of the formula —SRS—(Y)$_z$— where $z$ is zero or one derived from a dimercaptan HSRSH in which Y is a divalent hydrocarbon radical Q, a

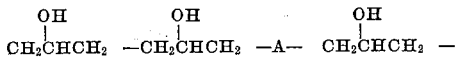

in which "A" is an aromatic-containing divalent hydrocarbon radical of up to 15 carbon atoms, or Y is a

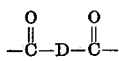

radical in which —D— is at least one of the groups represented by the formulas:

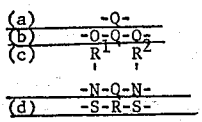

wherein each of R$^1$ and R$^2$ represents hydrogen or a monovalent lower hydrocarbon group or together represents a divalent alkylene bridge between the nitrogen atoms when Q is also an alkylene bridge and R is

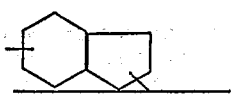

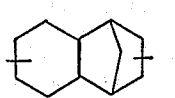

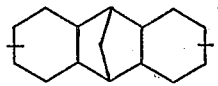

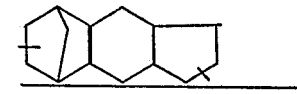

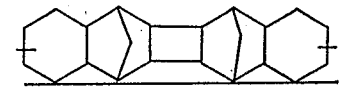

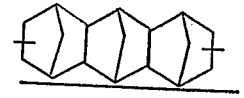

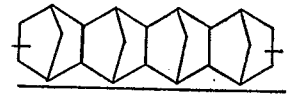

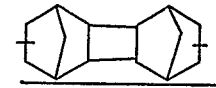

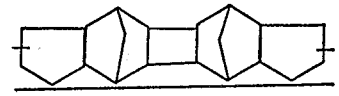

a divalent, aliphatic, polycyclic radical containing from 2 to about 8 saturated aliphatic rings therein, each ring being defined as the smallest number of covalently bonded carbon atoms which form a definable ring, which rings each contain 4 to 6 ring carbon atoms and the 2 mercapto radicals are each bonded to a different carbon atom, each mercapto-bonded carbon atom being in a different ring.

2. The homopolymer of claim 1 which has the average general formula

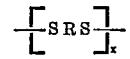

in which R is as defined in claim 1 and $x$ is of such a value that the homopolymer is a solid.

3. The copolymer of claim 1 which has the average general formula

in which R is as defined in claim 1

and Y is a divalent hydrocarbon radical Q, a

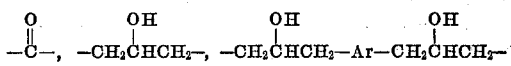

in which Ar is an aromatic-containing divalent hydrocarbon radical of up to 15 carbon atoms, or a

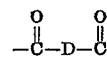

radical in which D is at least one of the groups represented by the formulas:

(a) $\quad -Q-$ (b) $\quad -O-Q-O-$ (c) 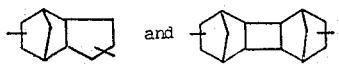

or (d) $\quad -S-R-S-$ wherein each of $R^1$ and $R^2$ represents hydrogen a monovalent lower hydrocarbon group, or together represents a divalent alkylene bridge between the nitrogen atoms when Q is also an alkylene bridge.

4. The composition of claim 1 where R is selected from a member of the group

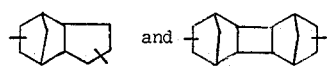

5. The composition of claim 2 where R is selected from a member of the group

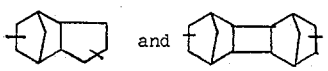

6. The composition of claim 3 where R is selected from a member of the group

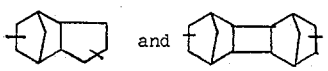

7. The polymer of claim 1 containing repeating units of a thiocarbonate radical and a radical of the formula:

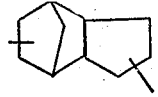

8. The polymer of claim 1 containing repeating units of a thioester radical and a radical of the formula:

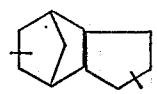

9. The polymer of claim 1 containing repeating units of a hydroxy thioether radical and a radical of the formula:

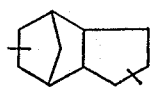

10. The polymer of claim 1 containing repeating units of a thioformal radical and a radical of the formula:

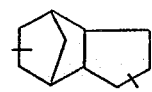

11. The polymer of claim 1 containing repeating units of a disulfide radical and a radical of the formula:

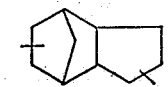

12. The polymer of claim 1 containing repeating units of a thioether radical and a radical of the formula:

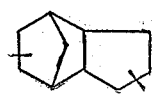

13. The polymer of claim 1 containing repeating units of a thiourethane radical and a radical of the formula:

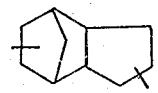

14. The polymer of claim 1 containing repeating units of a thiocarbonate radical and a radical of the formula:

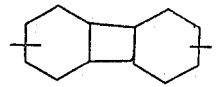

15. The polymer of claim 1 containing repeating units of a thioester radical and a radical of the formula:

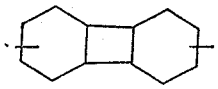

16. The polymer of claim 1 containing repeating units of a hydroxy thioether radical and a radical of the formula:

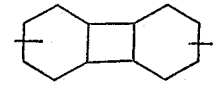

17. The polymer of claim 1 containing repeating units of a thioformal radical and a radical of the formula:

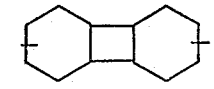

18. The polymer of claim 1 containing repeating units of a disulfide radical and a radical of the formula:

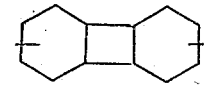

19. The polymer of claim 1 containing repeating units of a thioether radical and a radical of the formula:

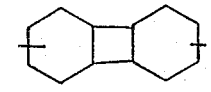

20. The polymer of claim 1 containing repeating units of a thiourethane radical and a radical of the formula:

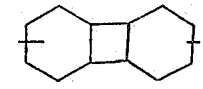

References Cited
UNITED STATES PATENTS

| | | | |
|---|---|---|---|
| 2,960,495 | 11/1960 | Stansbury Jr. et al. | 260—79.1 |
| 2,996,516 | 8/1961 | Guest et al. | 260—340.7 |
| 2,998,427 | 8/1961 | Stansbury, Jr. et al. | 260—340.7 |
| 3,037,967 | 6/1962 | Louthan | 260—79 |
| 3,294,760 | 12/1966 | Hay | 260—79 |
| 3,429,859 | 2/1969 | Meyers et al. | 260—79 |

DONALD E. CZAJA, Primary Examiner

M. I. MARQUIS, Assistant Examiner

U.S. Cl. X.R.

117—127 R, 138.8 R, 138.8 D, 143 A; 161—190 R, 213 R; 260—30.8 DS, 32.6 R, 32.6 N, 32.8 R, 32.8 N, 33.8 UR 47 R, 79 R, 79.1 R